United States Patent
Wilson et al.

(10) Patent No.: US 12,211,021 B2
(45) Date of Patent: Jan. 28, 2025

(54) SYSTEM AND METHOD FOR SUBSCRIPTION BASED SOLUTION IMPLEMENTATION

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 380 days.

(21) Appl. No.: 17/570,664

(22) Filed: Jan. 7, 2022

(65) Prior Publication Data

US 2023/0222471 A1    Jul. 13, 2023

(51) Int. Cl.
G06F 9/445 (2018.01)
G06F 8/65 (2018.01)
G06Q 20/12 (2012.01)
H04L 67/00 (2022.01)

(52) U.S. Cl.
CPC ............ G06Q 20/127 (2013.01); G06F 8/65 (2013.01); H04L 67/34 (2013.01)

(58) Field of Classification Search
CPC .......... G06Q 20/127; G06F 8/65; H04L 67/34
See application file for complete search history.

(56) References Cited

U.S. PATENT DOCUMENTS

| | | | |
|---|---|---|---|
| 6,317,815 B1 | 11/2001 | Mayer et al. | |
| 6,421,727 B1 | 7/2002 | Reifer et al. | |
| 7,464,163 B1 | 12/2008 | Bantz et al. | |
| 7,647,392 B2 * | 1/2010 | Sharma | H04L 9/40 717/171 |
| 9,178,948 B2 | 11/2015 | Chen et al. | |
| 9,705,995 B2 | 7/2017 | Edlund et al. | |
| 10,031,763 B1 | 7/2018 | Siebenthaler | |
| 10,044,522 B1 | 8/2018 | Shamis et al. | |
| 10,262,309 B1 | 4/2019 | Chan et al. | |
| 11,397,823 B1 | 7/2022 | Argenti | |
| 11,588,909 B1 | 2/2023 | Wilson et al. | |

(Continued)

OTHER PUBLICATIONS

Souvik Chakravarty (2019). Arm System Control Processor (SCP) Firmware-101. Linaro. https://static.linaro.org/connect/san19/presentations/san19-117.pdf.

(Continued)

*Primary Examiner* — Chuck O Kendall
(74) *Attorney, Agent, or Firm* — Womble Bond Dickinson (US) LLP

(57) ABSTRACT

Methods, systems, and devices for providing for providing computer implemented services using managed systems are disclosed. To improve the likelihood of the computer implemented services being provided, a subscription based model may be used to manage the managed systems. The subscription based model may provide for automatic configuration of and software deployment to any number of managed systems to provide subscribed to solutions to various users. To manage subscriptions, a highly available management service may be provided to users. The management service may allow users to select desired services. Once selected, the management service may automatically modify various managed systems to provide the subscribed solution.

20 Claims, 11 Drawing Sheets

(56) References Cited

U.S. PATENT DOCUMENTS

| | | |
|---|---|---|
| 11,632,315 B1 | 4/2023 | Sawal et al. |
| 11,671,379 B1 | 6/2023 | Wilson et al. |
| 11,803,667 B2 | 10/2023 | Singh et al. |
| 2003/0131028 A1 | 7/2003 | Radi et al. |
| 2005/0122900 A1 | 6/2005 | Tuulos et al. |
| 2005/0182843 A1 | 8/2005 | Reistad et al. |
| 2006/0010477 A1 | 1/2006 | Yu |
| 2006/0136747 A1 | 6/2006 | Ahdout et al. |
| 2007/0091862 A1 | 4/2007 | Ioannidis |
| 2007/0214193 A1 | 9/2007 | Takahashi et al. |
| 2008/0215796 A1* | 9/2008 | Lam .................. G06F 9/44505 714/E11.12 |
| 2008/0235784 A1 | 9/2008 | Basner et al. |
| 2008/0256641 A1 | 10/2008 | Lo |
| 2009/0077407 A1 | 3/2009 | Akimoto |
| 2012/0005649 A1 | 1/2012 | Lavin |
| 2012/0042388 A1 | 2/2012 | Rive et al. |
| 2012/0076131 A1 | 3/2012 | Bianconi |
| 2012/0144177 A1 | 6/2012 | Iyigun et al. |
| 2012/0311673 A1 | 12/2012 | Sodah |
| 2013/0007437 A1 | 1/2013 | Shroni et al. |
| 2013/0198346 A1 | 8/2013 | Jubran et al. |
| 2013/0283298 A1* | 10/2013 | Ali .................. G06F 9/5077 719/319 |
| 2013/0339306 A1 | 12/2013 | Kim et al. |
| 2013/0347025 A1 | 12/2013 | Prakash et al. |
| 2014/0074793 A1 | 3/2014 | Doering et al. |
| 2015/0005033 A1 | 1/2015 | Petersson et al. |
| 2015/0271276 A1 | 9/2015 | Edlund et al. |
| 2015/0278323 A1 | 10/2015 | Melahn et al. |
| 2015/0373012 A1 | 12/2015 | Bartz |
| 2016/0150396 A1 | 5/2016 | Milhizer |
| 2016/0188868 A1 | 6/2016 | Otturu et al. |
| 2016/0231804 A1 | 8/2016 | Bulusu et al. |
| 2017/0006119 A1 | 1/2017 | Pogrebinsky et al. |
| 2017/0048713 A1 | 2/2017 | Guday et al. |
| 2017/0090912 A1 | 3/2017 | Fuglsang et al. |
| 2017/0244783 A1 | 8/2017 | Maresca |
| 2017/0359356 A1 | 12/2017 | Brandwine |
| 2019/0044793 A1 | 2/2019 | Chew |
| 2021/0067406 A1 | 3/2021 | Myers et al. |
| 2021/0160255 A1 | 5/2021 | Cherkas et al. |
| 2021/0342173 A1 | 11/2021 | Tsirkin |
| 2021/0360074 A1 | 11/2021 | Long |
| 2022/0164838 A1 | 5/2022 | Wang |
| 2022/0200928 A1 | 6/2022 | Garrison et al. |
| 2023/0171586 A1 | 6/2023 | Holmes |
| 2023/0221784 A1 | 7/2023 | Wilson et al. |
| 2023/0221997 A1 | 7/2023 | Wilson et al. |
| 2023/0222080 A1 | 7/2023 | Wilson et al. |
| 2023/0222468 A1 | 7/2023 | Wilson et al. |
| 2023/0222469 A1 | 7/2023 | Wilson et al. |
| 2023/0222470 A1 | 7/2023 | Wilson et al. |
| 2023/0224216 A1 | 7/2023 | Wilson et al. |
| 2023/0229512 A1 | 7/2023 | Sawal et al. |
| 2023/0229516 A1 | 7/2023 | Sawal et al. |
| 2023/0229818 A1 | 7/2023 | Sawal et al. |
| 2023/0232549 A1 | 7/2023 | Sawal et al. |
| 2023/0342787 A1 | 10/2023 | Mohanty et al. |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

SYSTEM AND METHOD FOR SUBSCRIPTION BASED SOLUTION IMPLEMENTATION

FIELD DISCLOSED HEREIN

Embodiments disclosed herein relate generally to system management. More particularly, embodiments disclosed herein relate to systems and methods to deploy solutions based on subscriptions.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
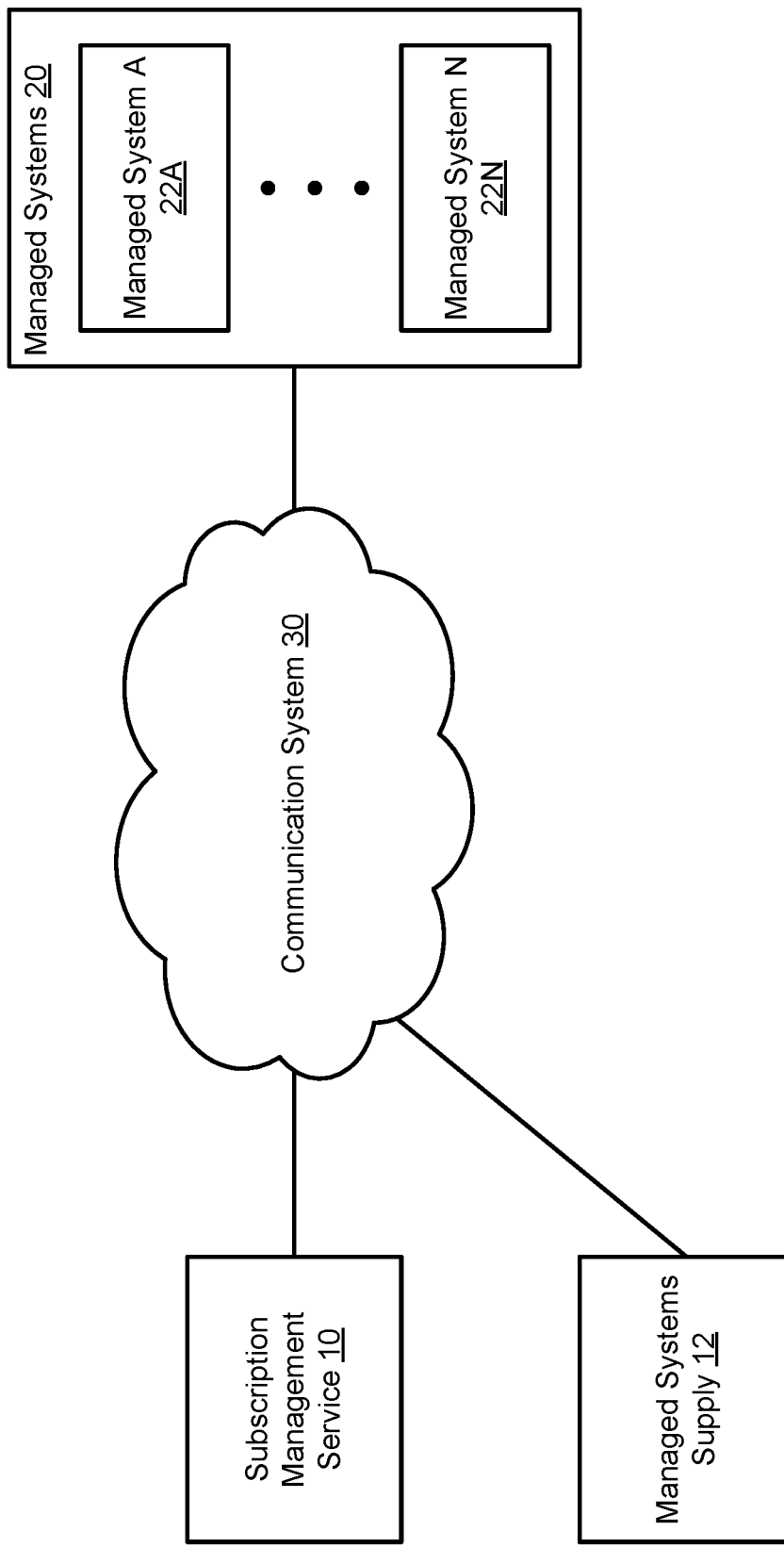
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs. An aggregation of different types of computer implemented services may need to be provided so that corresponding solutions may be provided.

To facilitate use of solutions, embodiments disclosed herein may utilize a subscription based model for managing various managed systems that may provide all, or a portion, of the solutions. The subscription based model may provide for automatic configuration of and software deployment to any number of managed systems to provide subscribed to solutions to various users.

To manage subscriptions, a highly available management service may be provided to users. The management service may allow users to select desired services. Once selected, the management service may automatically modify various managed systems to provide the subscribed solution.

To manage subscription expiration, information regarding subscription limitations may also be distributed to the managed systems. The managed system may independently utilize the subscription limitations to restrict access to their respective functionalities. Consequently, the managed system may only provide those solutions and services to which the users are subscribed.

In an embodiment, a computer-implemented method for providing a solution using managed systems is provided. The method may include obtaining, by a local subscription manager hosted by a managed system of the managed system, a subscription update for the managed system; based on the subscription update: updating, by the local subscription manager, operation of: a startup manager of the managed system, an operation manager of the managed system, and a software stack of the managed system; locally registering, by the local subscription manager, a subscription based on the updating; remotely registering, by the local subscription manager, the subscription with a subscription management service that initiated the subscription update; and enforcing, by the local subscription manager, the locally registered subscription on the managed system.

Updating the operation of the startup manager may include reconfiguring the startup manager to indicate that the managed system provides a function associated with the subscription, the function being part of the solution; and reconfiguring the startup manager to perform a startup of the managed system based on the subscription, the startup comprising a series of operations and being different from a second series of operations performed by the startup manager prior to reconfiguration of the startup manager.

Updating the operation of the operation manager may include identifying an operating system based on the subscription update; obtaining a copy of an image of the operating system; and deploying the image to the managed system, the deployed image causing the managed system to host a copy of the operating system after the reconfigured startup manager completes startups of the managed system and the operating system being different from a second operating system hosted by the managed system prior to deployment of the image of the operating system to the managed system.

Obtaining the copy of the image of the operating system may include sending a request for the image to a deployment manager associated with the managed systems; and receiving a copy of the image from the deployment manager provided in response to the request for the image.

Updating the operation of the software stack may include identifying a new software stack based on the subscription update; obtaining a copy of the new software stack; and deploying the new software stack to the managed system, the deployed new software stack providing computer implemented services for the solution while the copy of the operating system is hosted by the managed system, and the computer implemented services being different from second computer implemented services provided by the software stack prior to deployment of the new software stack.

Obtaining the copy of the new software stack may include sending a request for the new software stack to a deployment manager associated with the managed systems; and receiving a copy of the new software stack from the deployment manager provided in response to the request for the new software stack.

The operation of the operation manager may be updated: prior to updating of the operation of the software stack, and after updating of the operation of the startup manager.

The managed system may be rebooted after the updating of the operation manager and prior to the updating of the software stack.

The local subscription manager may include a computing device hosted by the managed system, and the computing device operates independently from the managed system. The computing device may receive the subscription update via an out of band management interface to the subscription management service.

Enforcing the locally registered subscription on the managed system may include making a determination that the locally registered subscription has expired; and based on the determination, disabling a portion of the startup manager, the operation manager, and the software stack to prevent the solution from being provided with the managed system.

The portion may be disabled while the local subscription manager is unable to communicate with the subscription management service.

In an embodiment, a non-transitory media is provided that may include instructions that when executed by a processor cause the computer-implemented method to be performed.

In an embodiment, a managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices (e.g., data processing systems) that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components of one or more managed systems may give rise to an integrated solution, platform, service, etc. able to provide desired computer implemented services. Changes in the hardware and/or software components of managed system may provide for various types of different computer implemented services to be provided over time.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
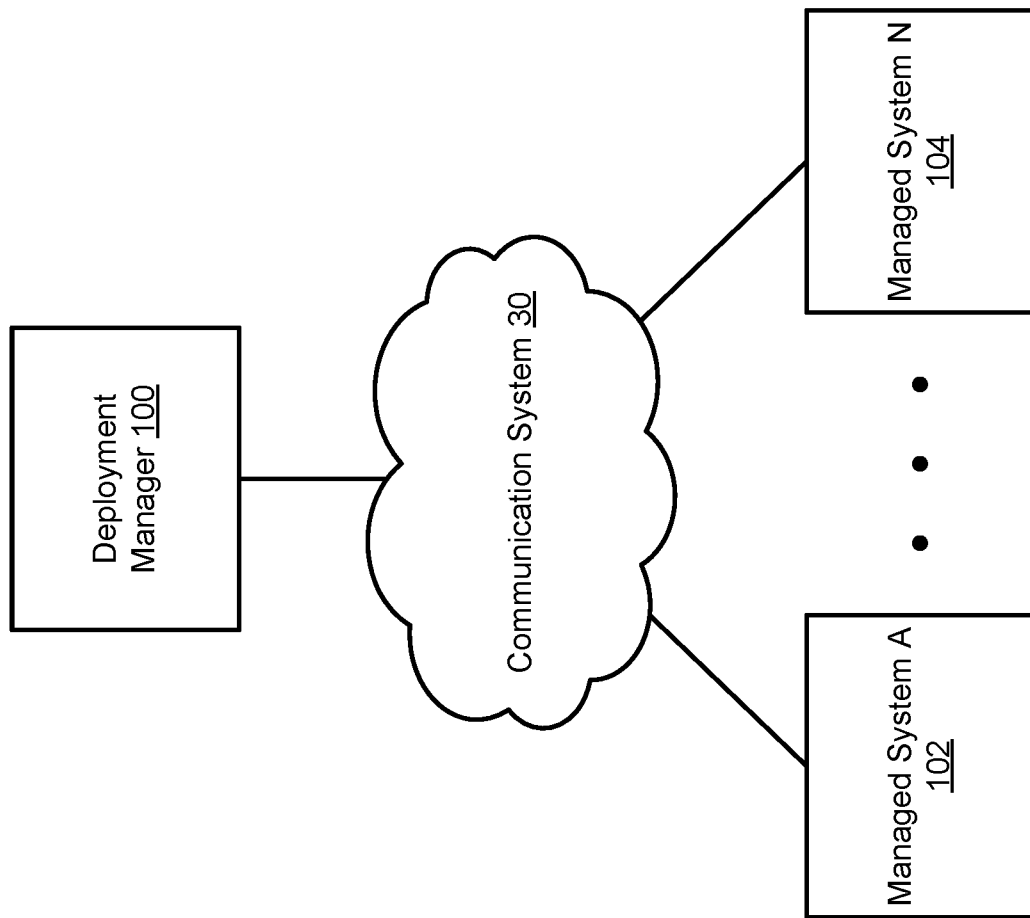
FIG. 1B shows a block diagram illustrating a deployment in accordance with an embodiment.
Figure 1C:
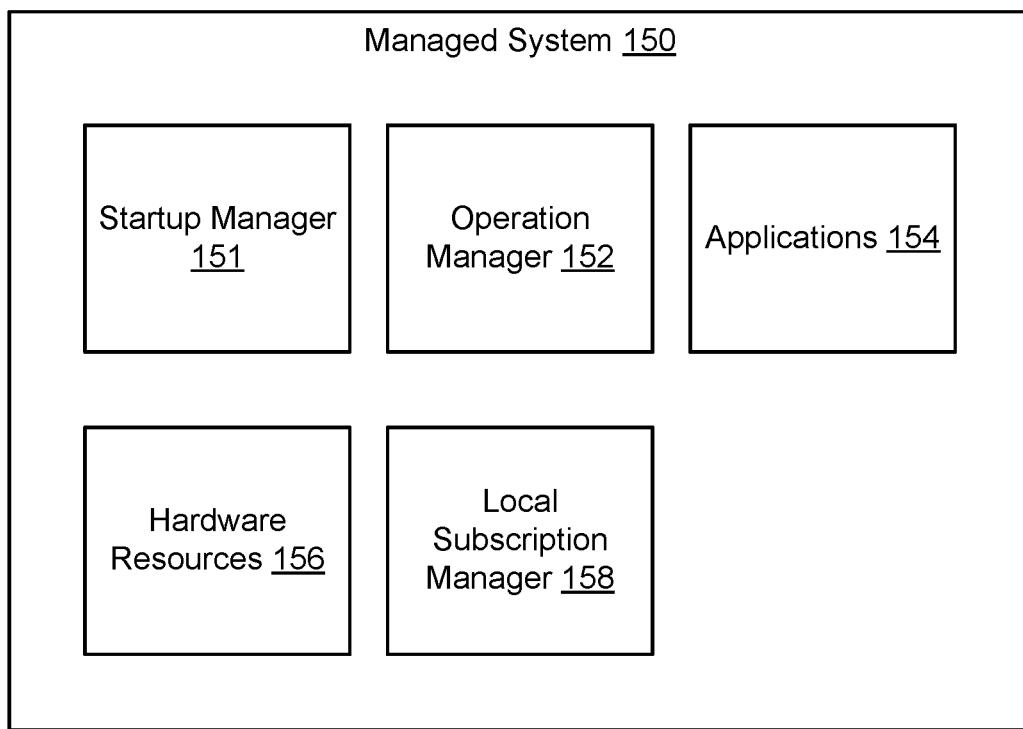
FIG. 1C shows a block diagram illustrating a managed system in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components, software components, and/or applications may need to be implemented by managed systems 20 depending on the computer implemented services desired to be provided by the respective managed systems. Refer to FIG. 1C for additional details regarding managed systems 20.

Additionally, any number of the managed system may operate (e.g., as part of a deployment) to provide various computer implemented services independently or cooperatively with other such managed systems. In such scenarios, the operation of a group of managed system may be managed by a local control plane for those managed systems. Refer to FIG. 1B for additional details regarding groups of managed systems.

However, to provide desired computer implemented services, corresponding configurations of hardware and/or software components (e.g., applications) necessary for corresponding computer implemented services to be provided by the managed systems may need to be identified, which may be technically challenging. For example, a person may need to be familiar with a range of hardware and software component issues to effectively select the hardware components and/or software components of a system so that the system is capable of providing the desired computer implemented services. Additional complexities may arise when multiple such systems may need to operate cooperatively to provide the computer implemented services. Further, if a system is procured that lacks necessary hardware and/or software components, the procured system may not be able to provide its desired functions.

In general, embodiments disclosed herein relate to system, devices and methods for managing one or more managed systems in a manner that may improve the likelihood of the managed system being able to provide desired computer implemented services over time. To do so, a system in accordance with embodiments may manage the provisioning of solution level functionality by automating the process of deploying, configuring, and managing the operation of any number of managed systems. To facilitate automated deployment of solution level functionality, a management service may be provided. Rather than requiring a person to select the type, quantity, software components, and/or other features of managed systems, the management service may allow a user to focus on the desired functionality (e.g., a particular solution) which is to be provided. The management service may automatically translate the desired functionality into a workable deployment configuration of any number of managed systems. The management service may, after the managed systems are deployed, automatically configure, deploy software components to, and/or otherwise manage the operation of the managed systems to provide the desired functionality to the user.

By doing so, embodiments disclosed herein may (i) reduce the cognitive burden for selecting and managing systems to provide computer implemented services for desired solutions, (ii) may improve the quality of computer implemented services by ensuring that only solutions supported by the deployment managed systems are attempted to be implemented with the managed systems, and/or (iii) automatically limiting the use of the desired solutions in a manner consistent with that expected by the user to manage cost associated with use of the desired solution.

To provide the above noted functionality, a system in accordance with an embodiment may include subscription management service 10. Subscription management service 10 may facilitate (i) selection and procurement of managed system to a client site (e.g., a deployment location), and (ii) automatic configuration of managed systems 20 to provide an integrated solution. To do so, subscription management service 10 may (i) obtain information indicating desired functions of one or more of managed systems 20, (ii) select and deploy one or more managed systems 20 to a client site (e.g., which may be stored in managed systems supply 12 prior to deployment), (iii) automatically deploy software components to managed systems 20 using a subscription model, and (iv) manage the use of the deployed manage systems using the subscription model.

To deploy a solution, a known topology of management entities and/or a software stack may be instantiated on the managed systems. Once instantiated and operational, a subscription corresponding to a solution provided by the instantiated entities/software may be both locally recorded with the managed systems and remotely recorded with the management service.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made on the basis that the requesting entity may be likely to request additional features and/or capabilities in the future. Consequently, managed systems 20, when deployed to a client site, may include sufficient hardware components to address a range of different use cases and solution, beyond those that may be immediately apparent to a requesting entity. The additional capabilities (e.g., various hardware resources) may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20).

Subscription management service may also allow a provider of managed systems 20 to selectively manage various functionalities provided by managed systems 20. For example, the service may allow for different solutions to be provided by managed systems 20 over time. By doing so, a provider of managed systems 20 may tailor the functions provided by managed systems 20 (e.g., from all possible functions) to only those requested, desired, and/or procured by an operator, manager, and/or user of managed systems 20. Doing so may allow for cost controls for various solutions to be put in place by a user of a managed system.

For example, consider a scenario where a provider of a managed system does so on a contractual basis where a user of the managed system agrees to purchase subscriptions for various solutions. The user may use subscription management service 10 to select to which of the aforementioned solutions the user wishes to have enabled, to the extent of such enablement, durations of enablement, etc. After an initial selection leading to deployment of managed systems 20, the user may modify their subscription to allow for other solutions to be provided by managed systems 20. In response, subscription management service 10 may cooperate with local subscription managers hosted by managed systems 20 to reconfigure the operation of managed systems 20 to allow these additional (or reduced numbers of) features to be utilized by the users.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client/user devices not illustrated in FIG. 1A but may be operably connected to subscription management service 10 via communication system 30 or directly using managed systems 20). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service.

To facilitate solution selection, the graphical user interfaces presented to the users may present solutions that are compatibility with managed systems 20. Accordingly, the persons tasked with managed systems may not need to be aware of the current configuration of managed systems 20, the capabilities, or limitations of managed systems 20 to identify which solutions the managed systems may provide.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii)

code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information). Consequently, user access to solutions provided by managed systems may be automatically revoked by the managed systems thereby facilitating distributed management of the managed systems that does not rely on or require communication with other entities.

Any of subscription management service 10, managed systems supply 12, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

In an embodiment, one or more of subscription management service 10, managed systems supply 12, and managed systems 20 are operably connected via communication system 30. Communication system 30 may allow any of subscription management service 10, managed systems supply 12, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 5), a public network, and/or may include the Internet. For example, managed systems 20 may be operably connected to subscription management service 10 via the Internet. Subscription management service 10, managed systems supply 12, managed systems 20, and/or communication system 30 may be adapted to perform one or more protocols for communicating via communication system 30.

While illustrated in FIG. 1A with a limited number of specific components, a system may include additional, fewer, and/or different components without departing from embodiments disclosed herein.

Turning to FIG. 1B, a block diagram illustrating a deployment including managed systems 102, 104 in accordance with an embodiment is shown. Like named components in FIGS. 1A-1B may be similar.

The deployment may provide any number and type of computer implemented services. The deployment may be located, for example, at a user selected site, a data center, or another location. The deployment may provide various solutions to users of, for example, an organization on a contractual basis. For example, the organization may agree to pay fees for the solutions provided by the deployment. The solutions may include any number and type of computer implemented services provided by any number of managed systems 102, 104.

The deployment may include deployment manager 100. Deployment manager 100 may locally manage any number of managed systems 102, 104. For example, the subscription management service 10 may obtain information regarding desired solutions and provide information usable to provide the solutions to deployment manager 100 which may in turn manage managed systems 102, 104 based on the information.

To facilitate management, deployment manager 100 may (i) host (or may retrieve/facilitate retrieval of) various software images to facilitate deployment of software necessary for various solutions for managed systems 102, 104 to be implemented, (ii) manage communications such as acknowledgements between subscription management service 10 and managed systems 102, 104 during implementation of solutions, and/or (iii) provide other management functionalities. Thus, deployment manager 100 may function as a control plane for any number of managed systems 102, 104, which may be managed via software deployment to cooperatively provide one or more solutions.

Deployment manager 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

Turning to FIG. 1C, a block diagram illustrating managed system 150 in accordance with an embodiment is shown. Managed system 150 may be similar to any of managed systems 20 shown in FIGS. 1A-1B. Managed system 150 may provide desired computer implemented service by allowing for its automatic reconfiguration over time based on subscriptions maintained by subscription management service 10, shown in FIG. 1A. When reconfigured, managed system 150 may provide (in isolation and/or cooperation with other managed systems) a solution.

To provide the solutions, a combination of management entities and a software stack may need to be deployed to a host managed system. Additionally, various configurations for the managed system may need to be set. Different solutions may be provided with similar or different combinations of management entities, software stacks, and various configurations.

Figure 6:
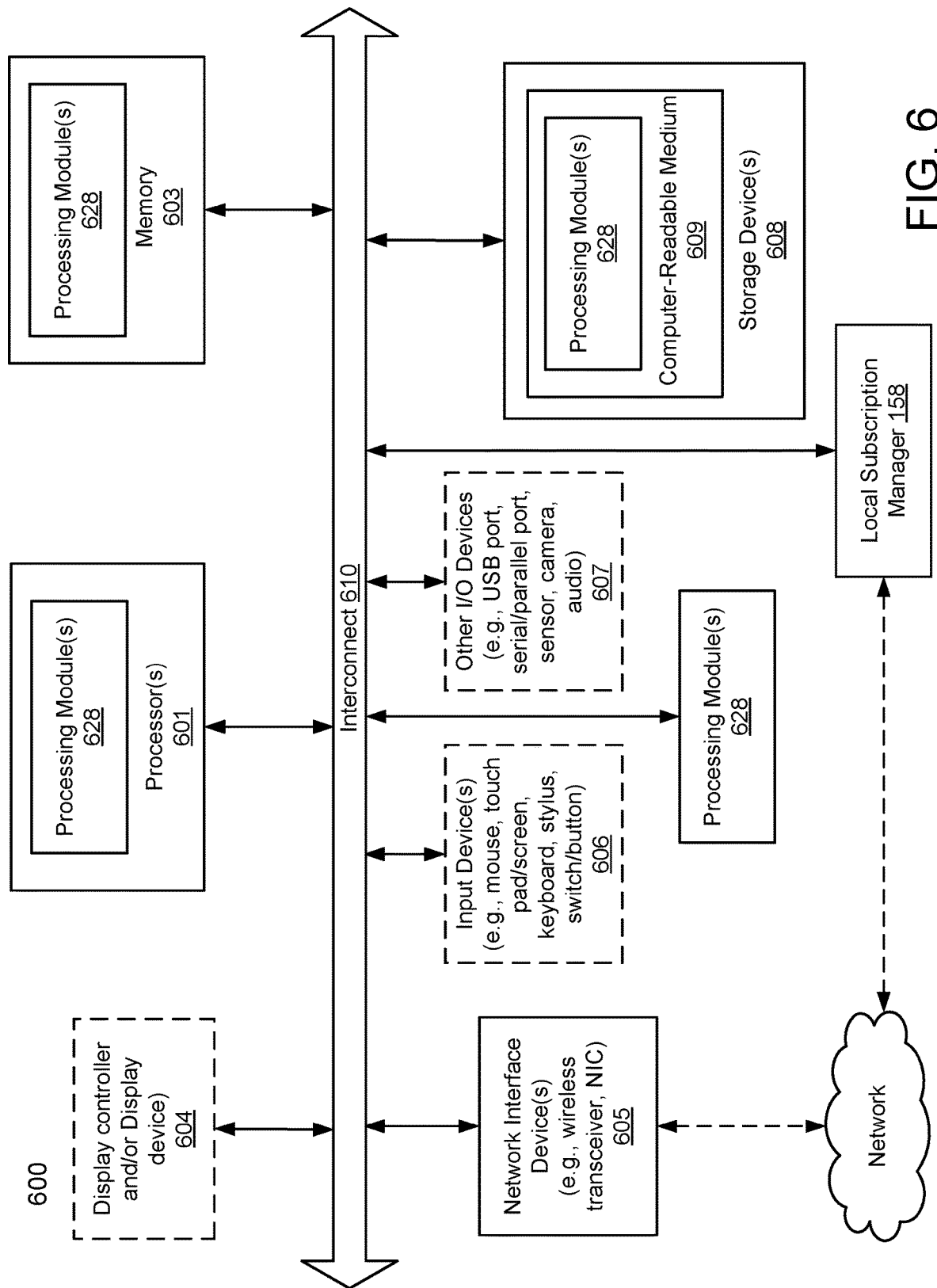
FIG. 6 shows a block diagram illustrating a computing device in accordance with an embodiment.

In addition (and/or alternatively) to any of the components shown in FIG. 6, managed system 150 may include startup manager 151, operation manager 152, applications 154, hardware resources 156, and local subscription manager 158. Each of these components is discussed below.

Startup manager 151 may manage placing managed system 150 in an operating state conducive to operation of applications 154 (e.g., which may include one or more software stacks). For example, after managed system 150 is power cycled, managed system 150 may not be in an operating state in which (all or a portion of) applications 154 may operate. To enter the operating state, startup manager 151 may perform any number processes such as (i) a power on self-test, (ii) displaying various portions of information regarding the function of a host managed system, (iii) performing an inventory of hardware resources 156, and (iv) beginning execution of and/or handing off operation management of managed system 150 to operation manager 152 (e.g., the actions in aggregate being a "startup"). Startup manager 151 may be implemented with, for example, a basic input output system (BIOS) or other type of startup management entity.

In an embodiment, startup manager 151 includes one or more configurations which may modify the manner in which it performs the startup. For example, the configurations may allow various actions to be added to, removed from, or modified in the startup.

In an embodiment, startup manager 151 also includes functionality to cause information regarding the function of a host managed system to be presented. For example, startup manager 151 may include functionality to generate and display graphical user interfaces which may indicate, to users, a function of the host managed system. Different types of graphical user interfaces may be displayed depending on how a "personality" of a host managed system is set thereby allowing users to be appraised regarding the expected functionality of the host managed system.

Operation manager 152 may generally manage operation of the component of managed system 150, except for local subscription manager 158. For example, operation manager 152 may be implemented with an operating system (and/or other management entities such as drivers, translation tables, etc.) used to manage hardware resources 156 of managed system 150 to facilitate execution of applications 154.

To facilitate provisioning of a solution with managed system 150, local subscription manager 158 may facilitate automatic deployment of software components, settings, and/or other features to managed system 150. The deployed software components may include all, or a portion, of startup manager 151, operation manager 152, and applications 154.

To ensure that only software components compatible with hardware resources 156 are deployed, local subscription manager 158 may maintain current information regarding hardware resources such as the types and quantities of hardware devices of hardware resources 156. Local subscription manager 158 may use the current information to identify compatibility between managed system 150 and various solutions, and enforce solution limitations (e.g., restrict) on managed system 150.

Applications 154 may provide all, or a portion, of the computer implemented services desired by a user, operator, or other person associated with managed system 150. For example, applications 154 may include one or more software stacks corresponding to on one or more solutions.

Applications 154 may utilize hardware resources 156 to provide their respective functionalities. The type and quantity of applications 154 that may be hosted by managed system 150 may depend on hardware resources 156 (e.g., types and quantity of hardware devices).

Operation manager 152 may mediate presentation of hardware resources 156 to applications 154 by, for example, scheduling use, managing discontinuous access, and/or performing other actions to coordinate use of hardware resources 156 by applications 154 (and/or other entities). Consequently, the operation of applications 154 may be predicated on the operation of operation manager 152 as well as the capabilities of hardware resources 156.

In an embodiment, one or more of startup manager 151, operation manager 152, and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of startup manager 151, operation manager 152, and applications 154. One or more of startup manager 151, operation manager 152, and applications 154 may be implemented using other types of hardware devices without departing embodiment disclosed herein.

In an embodiment, one or more of startup manager 151, operation manager 152, and applications 154 is implemented using a processor adapted to execute computing code stored on a persistent storage that when executed by the processor performs the functionality of one or more of startup manager 151, operation manager 152, and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of startup manager 151, operation manager 152, applications 154, and/or other entities not shown in FIG. 1C. As part of their respective operation, hardware resources 156 may host firmware and/or may otherwise be programmable to facilitate their respective operation.

Local subscription manager 158 may provide subscription management services. Subscription management services may include (i) obtaining subscription updates, (ii) removing, adding, or modifying software components (e.g., startup manager 151, operation manager 152, applications 154, etc.) based on the subscription updates, and (iii) enforcing the subscription updates including any limitations specified therein.

By providing its functionality, local subscription manager 158 may manage the configuration, behavior, and/or functionality of managed system 150 in a manner that automatically conforms it to match that expected by subscription management service 10 (e.g., to match those solutions to which managed system 150 is subscribed). As part of the aforementioned process, local subscription manager 158, subscription management service 10, and/or deployment manager 100 may cooperate to enforce subscriptions on managed system 150.

Local subscription manager 158, subscription management service 10, and/or deployment manager 100 may also perform one or more authentications of one another and/or communications from these components to prevent other entities from interfering with the cooperative operation of local subscription manager 158, subscription management service 10, and/or deployment manager 100 for managed system management purposes.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 610, shown in FIG. 6), and may operate independently from other components (e.g., hardware and software) of managed system 150. The management controller may include functionality to manage the operation, configuration, and/or other characteristic of any hardware and/or software components of managed system 150. For example, the management controller may include functionality to load software components on a host managed system, obtain information regarding hardware resources 156, etc.

In an embodiment, the management controller includes a separate communication interface (e.g., from that of a communication interface of managed system 150, referred to as an out of band interface) through which it communicates with subscription management service 10 and/or deployment manager 100. In an embodiment, the management controller uses the same communication interface (e.g., an in band interface) which managed system 150 uses to communicate with other devices. Either of these communication interfaces may facilitate communications with communication system 30, and devices connected to communication system 30 such as subscription management service 10 or deployment manager 100.

Figure 1D:
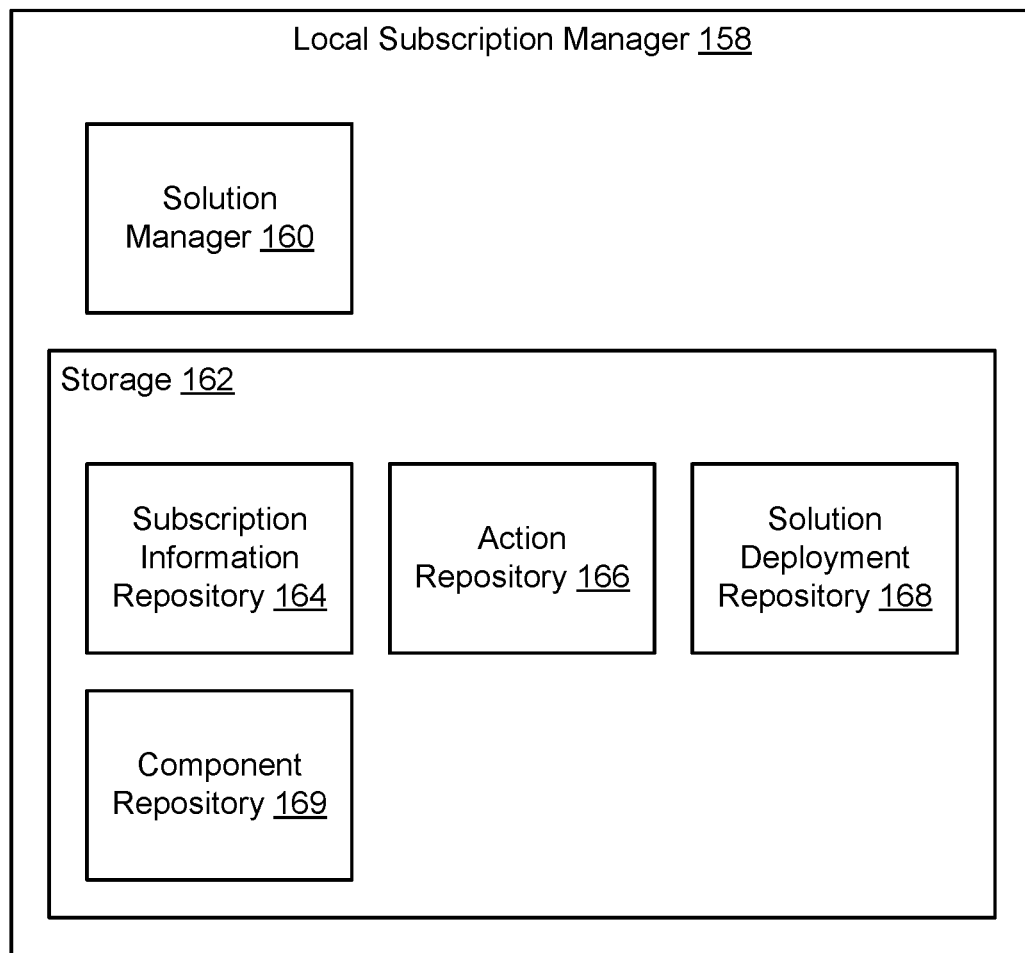
FIG. 1D shows a block diagram illustrating a local subscription manager in accordance with an embodiment.

When providing its functionality, local subscription manager 158 may perform all, or a portion, of the methods and operations illustrated in FIGS. 2-5B. Refer to FIG. 1D for additional details regarding local subscription manager 158.

While illustrated in FIG. 1C with a limited number of specific components, a managed system may include additional, fewer, and/or different components without departing from embodiments disclosed herein.

Turning to FIG. 1D, a block diagram of local subscription manager 158 in accordance with an embodiment is shown. Local subscription manager 158 may be implemented with a computing device similar to that illustrated in FIG. 6 (except for the local subscription manager). In addition (and/or alternatively) to any of the components shown in FIG. 6, local subscription manager 158 may include solution manager 160 and storage 162. Each of these components is discussed below.

Solution manager 160 may include functionality to (i) obtain information regarding solutions to be implemented by a host managed system, (ii) deploy software components to place the host managed system into condition to function as part of the solution, and (iii) record information regarding an enforce subscriptions, and limitations thereof, for the host managed system. By doing so, a host managed system may be more likely to provide desired computer implemented services by improving the likelihood that a managed system is configured to provide a desired solution.

In an embodiment, solution manager 160 is implemented using a hardware device including circuitry. The hardware device may be, for example, a digital signal processor, a field programmable gate array, or an application specific integrated circuit. The circuitry may be adapted to cause the hardware device to perform the functionality of solution manager 160. Solution manager 160 may be implemented using other types of hardware devices without departing embodiment disclosed herein.

In one embodiment, solution manager 160 is implemented using a processor adapted to execute computing code stored on a persistent storage that when executed by the processor performs the functionality of solution manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a host managed system that hosts local subscription manager 158.

Storage 162 may store data structures including subscription information repository 164, action repository 166, solution deployment repository 168, and component repository 169.

Subscription information repository 164 may be implemented with one or more data structures that store information regarding subscriptions for a host managed system. The information may include, for example, functionalities to be provided while a subscription is enforced, limitations on the duration of the subscription, and/or information usable to prevent use of a subscribed to function/solution. For example, subscription information repository 164 may include code blocks or other code executable by a host managed system that removes the ability of users of the host managed system to use one or more functionalities of the host managed system. Execution of the code blocks by a host managed system may be initiated by local subscription manager 158 when a corresponding subscription expires (or meets another type of limitation indicating that a code block should be executed).

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by solution manager 160 when a condition is met, such as a subscription limit being exceeded or a new subscription being obtained.

In an embodiment, action repository 166 includes at least one set of actions keyed to changes in subscription of a management entity for the host managed system. The actions may include (i) restarting/initializing a host managed system, (ii) after doing so, interrupting a normal startup process performed by the host managed system prior to the host managed system booting to a management entity, (iii) while the normal startup process is interrupted, dynamically configuring a management entity, and/or (iv) resuming the normal startup process such that the host managed systems hands off, after startup, operation of the managed system to the dynamically configured management entity. In this manner, the management entity utilized by a host managed system may be dynamically changed over time to meet the needs of users of the host managed system.

As new subscriptions are obtained and implemented, solution manager 160 may update subscription information repository 164 and/or action repository 166 based on the subscriptions. Thus, the subscriptions may be locally recorded. Likewise, solution manager 160 may remotely record implementation of the subscriptions with a subscription management service. Consequently, both subscription management service and local subscription manager may operate in accordance with the same information, thereby providing for a subscription based management model of solutions.

Solution deployment repository 168 may be implemented with one or more data structures that store information regarding how various types of solutions may be implemented with a host managed system. The information may include, for example, a list of software components to be hosted by a managed system to provide the solution, a list of actions and/or an order of the actions to cause the software components to be deployed, location information for various software components, and/or other information usable to implement a solution. While illustrated in FIG. 1D as being stored in the local subscription manager 158, solution deployment repository 168 may be hosted by other entities (e.g., deployment manager 100) which may obtain and provide relevant information from the repository for various solutions to be implemented by a host managed system.

Component repository 169 may be implemented with one or more data structures that store copies of or information usable to obtain copies of various software components and/or configuration settings for software and/or hardware components of a host managed system. Solution deployment repository 168 may include references to various portions of component repository 169 to allow for various software components and/or configuration settings to be obtained. While illustrated in FIG. 1D as being stored in the local subscription manager 158, component repository 169 may be hosted by other entities (e.g., deployment manager 100).

While various data structures have been illustrated and described in FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to local subscription manager 158 (e.g., in a storage of a deployment manager or subscription management service) in a manner that is still accessible to local subscription manager 158.

While illustrated in FIG. 1D with a limited number of specific components, a local subscription manager may include additional, fewer, and/or different components without departing from embodiments disclosed herein.

As discussed above, the components of FIG. 1A may perform various methods to provide computer implemented services using managed systems that may provide respective solutions. FIGS. 2-4B illustrate examples of methods that may be performed by the components of FIG. 1A.

Figure 2:
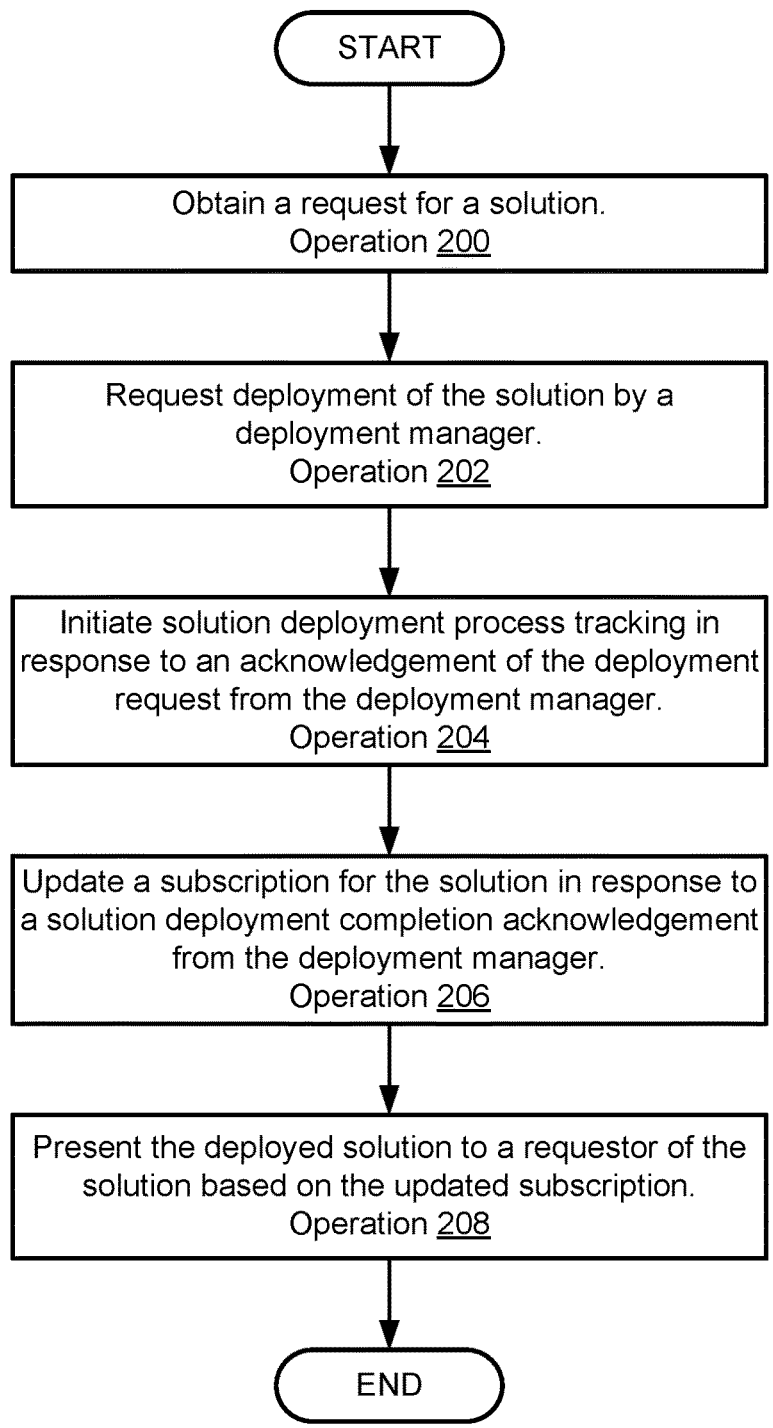
FIG. 2 shows a flow diagram illustrating a method of servicing solution requests in accordance with an embodiment.

Turning to FIG. 2, a flow diagram illustrating a method of servicing a solution request in accordance with an embodiment is shown. The method illustrated in FIG. 2 may be performed by a subscription management service a request for a solution is received.

At operation 200, a request for a solution is received. The request may be received by presenting one or more solutions for a deployment, or components thereof, to a user via a graphical user interface (e.g., presented to the user on a user device operably connected to the subscription management service). The user may select the solution and may also specify any limitations for a subscription to the solution such as, for example, a duration of the subscription. The solution request may be obtained via other methods without departing from embodiments disclosed herein.

In an embodiment, the solution request includes an identifier of a solution and one or more limitations (e.g., duration, number of performed services, processes, etc.) on a subscription to the solution. The solution may be any type of solution that may be provided with one or more corresponding computer implemented services.

At operation 202, deployment of the solution by a deployment manager is requested. The deployment manager may manage one or more managed systems. The deployment of the solution may be requested by sending a message to the deployment manager indicating the deployment request.

At operation 204, a solution deployment tracking processing is initiated in response to an acknowledgement of the deployment request from the deployment manager. The acknowledgement may be sent by the deployment manager to the subscription management service when one or more of the managed devices managed by the deployment manager begin a process of reconfiguration to provide the solution specified in the solution request. The solution deployment may be tracked by adding information to a subscription repository (e.g., maintained by the subscription management service) indicating that the solution is being prepared but is not yet subscribed to by the user (e.g., while the user is not able to utilize the solution by virtue of the managed systems performing the configuration process).

At operation 206, a subscription for the solution is updated in response to a solution deployment completion acknowledgement from the deployment manager. The solution deployment completion acknowledgement may be sent in a message to the subscription management service once the managed systems have been configured to provide the solution specified by the solution request. The subscription for the solution may be updated by modifying the subscription repository to indicate that the subscription is live as well as indicating any limitations with respect to the subscription for the solution (e.g., as specified by a user in operation 200).

At operation 208, the deployed solution is presented to a requestor of the solution based on the updated subscription. For example, the subscription management system may send a message or otherwise indicate to the requestor (e.g., the user that sent the solution request in operation 200) that the solution is available for use. Access information for the deployed solution may also be presented to the requestor.

The method may end following operation 208.

While various communications using messages have been described with respect to the operations of FIG. 2, other methods for managing a distributed system may be implemented without departing from embodiments disclosed herein. For example, public-subscribe systems, master-slave systems, and/or other types of distributed system management may be employed rather than and/or in conjunction with message passing or other command and control schemes.

Figure 3:
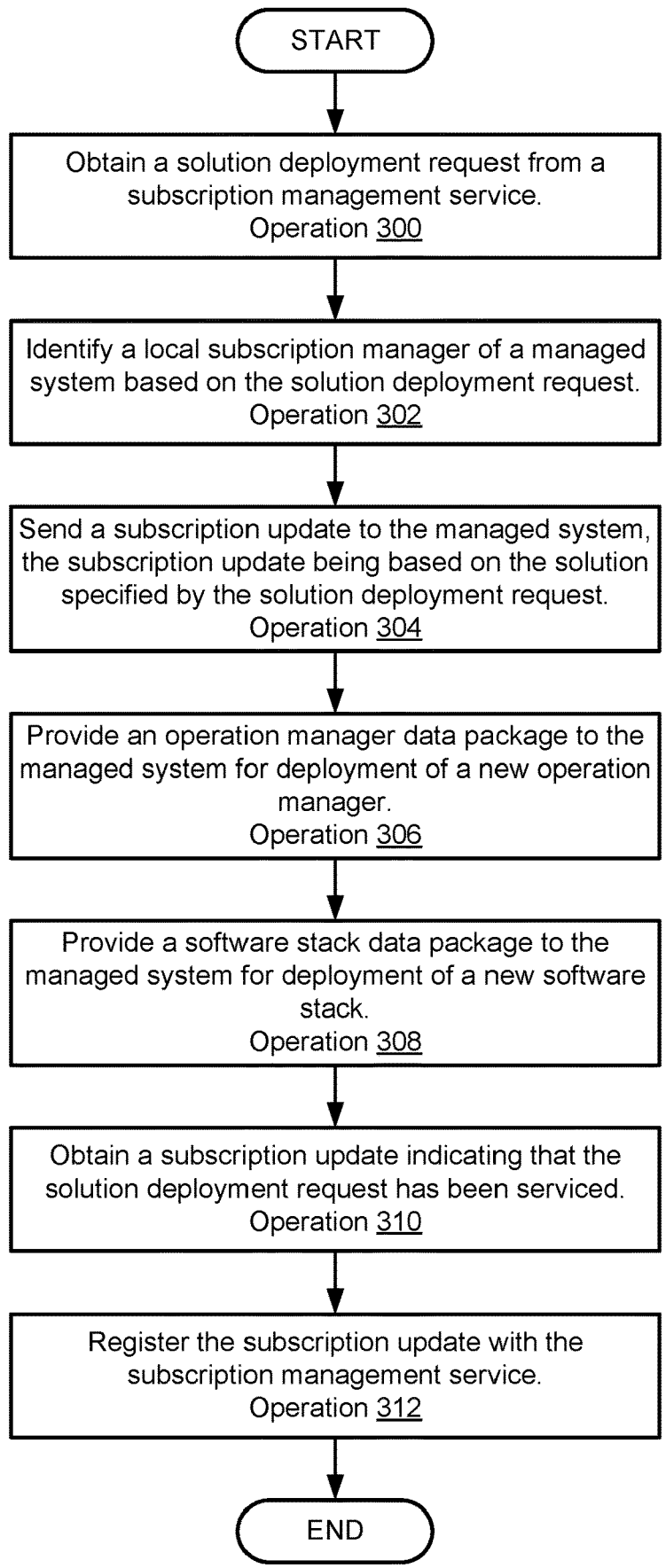
FIG. 3 shows a flow diagram illustrating a method of servicing solution deployment requests in accordance with an embodiment.

Turning to FIG. 3, a flow diagram illustrating a method of servicing a solution request in accordance with an embodiment is shown. The method illustrated in FIG. 3 may be performed by a deployment manager that manages any number of managed systems and is managed by a subscription management service.

At operation 300, a solution deployment request is obtained from a subscription management service. The solution deployment request may indicate a solution to be provided using managed systems that are managed by the deployment manager. The solution deployment request may also specify limitations on a subscription to the solution. The solution deployment request may be obtained in a message from the subscription management service.

At operation 302, a local subscription manager of a managed system is identified based on the solution deployment request. The managed system may include hardware resources sufficient to provide all, or a portion, of computer implemented services for the solution. The local subscription manager may be identified via a table or other type of look up data structure maintained by the deployment manager. The data structure may include information regarding the hardware resources of managed systems, access information for local subscription managers hosted by the managed systems, solutions being provided with the managed systems, and/or other types of information usable to ascertain which managed systems may be utilized to satisfy the solution deployment request without overloading the managed systems.

At operation 304, a subscription update is sent to the local subscription manager of the managed system. The subscription update may be based on the solution specified by the solution deployment request. The subscription update may include any number of enablement actions usable to deploy software components and/or perform configurations on the host managed system, specify any number of limitations (e.g., duration) for the subscription, and/or any number of disablement actions usable to prevent the enabled functionality associated with the subscription from being provided. For example, the disablement actions may include removing software, depowering various hardware resources, and/or other types of actions to limit the function of a managed system.

At operation 306, an operation manager data package is provided to the managed system for deployment of a new operation manager. The operation manager data package may be provided in response to a request from the local subscription manager hosted by the managed system. The local subscription manager may make the request when implementing or otherwise servicing the subscription update.

At operation 308, a software stack data package is provided to the managed system for deployment of a new software stack. The software stack data package may be provided in response to a request from the local subscription manager hosted by the managed system. The local subscription manager may make the request when implementing or otherwise servicing the subscription update.

At operation 310, a subscription update indicating that the solution deployment request has been serviced is obtained. The subscription update may be obtained from the local subscription manager hosted by the managed system. The local subscription manager may send the subscription update after completing service of the subscription update.

At operation 312, the subscription update is registered with the subscription management service. The subscription update may be registered by sending a message to the subscription management service. The message may indicate that the solution specified by the solution deployment request is deployed and available for use by a user that requested that the solution be deployed.

The method may end following operation 312.

The method illustrated in FIG. 3 may be repeated any number of times to facilitate configuration of any number of managed systems to provide a solution for a user. For example, operations 302-312 may be repeated until a number of managed systems with sufficient resources and capabilities are configured to cooperatively provide a solution (e.g., one or more computer implemented solutions that provide a functionality).

Figure 4A:
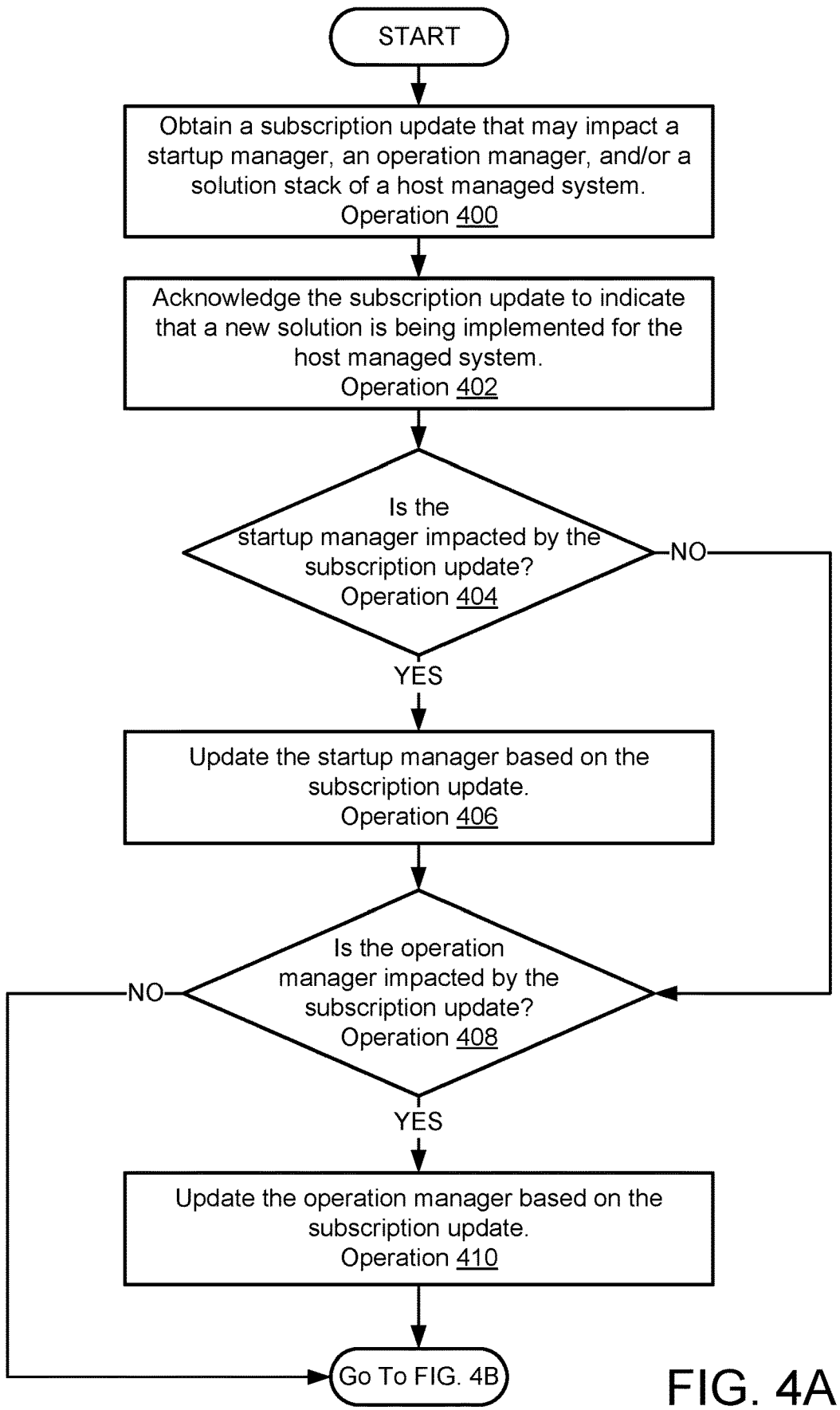
FIGS. 4A-4B show a flow diagram illustrating a method of servicing subscription updates in accordance with an embodiment.

Turning to FIG. 4A, a flow diagram illustrating a method of servicing a subscription update in accordance with an embodiment is shown. The method illustrated in FIG. 4A may be performed by a local subscription manager hosted by a host managed system.

At operation 400, a subscription update is obtained. The subscription update may be obtained from a deployment manager (e.g., via a message) that manages the host managed system. The subscription update may impact a startup manager, operation manager, and/or a solution stack of a host managed system. For example, the subscription update may specify enablement actions that cause any of these entities to be modified, replaced, removed, etc.

At operation 402, the subscription update is acknowledged to indicate that a new solution is being implemented by the host managed system. The subscription update may be acknowledged by sending a message indicating as such to the deployment manager. The deployment manage may report the acknowledgement to a subscription management service that manages that deployment manager and managed systems.

At operation 404, a determination is made regarding whether the startup manager is impacted by the subscription update. The determination may be made based on the subscription update which may specify or otherwise indicate whether a startup manager is to be reconfigured, modified, removed, and/or replaced, any of which may indicate that the subscription update impacts the startup manager.

If it is determined that the subscription update impacts the startup manager, then the method may proceed to operation 406. Otherwise the method may proceed to operation 408.

At operation 406, the startup manager is updated based on the subscription update. The startup manager may be updated by performing one or more of: (i) modifying a personality module of the startup manager to cause the startup manager to indicate that the host managed system performs a different function than it previously provided, (ii) modifying a configuration of the startup manager (e.g., which may cause additional, fewer, and/or different actions to be performed during startup of the host managed system), and/or (iii) replacing all, or a portion of the startup manager (e.g., by flashing or otherwise modifying data included in a protected storage in which computer instructions corresponding to the startup manager are stored.

To update the startup manager, the local subscription manager may use local information or may obtain information from a deployment manager such as, for example, images of a startup manager to be hosted by the host managed system.

At operation 408, a determination is made regarding whether the operation manager is impacted by the subscription update. The determination may be made based on the subscription update which may specify or otherwise indicate whether the operation manager is to be reconfigured, modified, removed, and/or replaced, any of which may indicate that the subscription update impacts the operation manager.

If it is determined that the subscription update impacts the operation manager, then the method may proceed to operation 410. Otherwise the method may proceed to operation 412 illustrated in FIG. 4B.

At operation 410, the operation manager is updated based on the subscription update. The operation manager may be updated by performing one or more of: (i) obtaining an image (e.g., executable code and/or configuration data) corresponding to a new operation manager, (ii) deploying the new operation manager using the image, and/or (iii) configuring the deployed operation manager using the configuration data. In an embodiment, the image is obtained from a deployment manager. The image may be obtained from other locations without departing from embodiments disclosed herein.

Once the new operation manager is deployed (or as part of the deployment), the managed system may be rebooted.

Figure 4B:
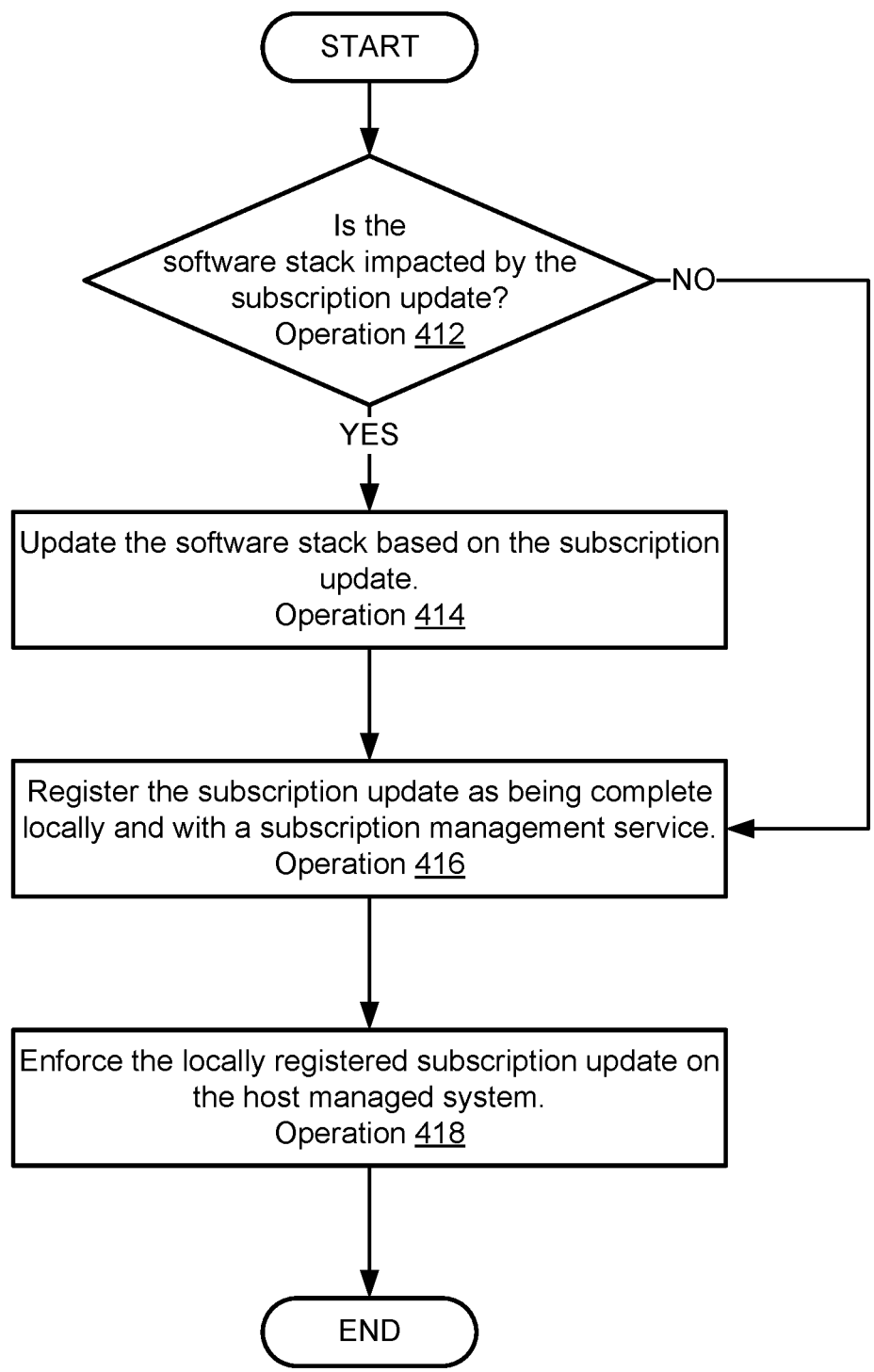

The method may proceed to operation 412 shown in FIG. 4B following operation 410.

Turning to FIG. 4B, a continuation of the diagram of FIG. 4A is shown.

At operation 412, a determination is made regarding whether the software stack is impacted by the subscription update. The determination may be made based on the subscription update which may specify or otherwise indicate whether the software stack is to be reconfigured, modified, removed, and/or replaced, any of which may indicate that the subscription update impacts the operation manager.

If it is determined that the subscription update impacts the software stack, then the method may proceed to operation 414. Otherwise the method may proceed to operation 416.

At operation 414, the software stack is updated based on the subscription update. The software stack may be updated by performing one or more of: (i) obtaining an image (e.g., executable code and/or configuration data), binary files, or other data structures corresponding to a new software stack, (ii) deploying the new software stack using the data structures, and/or (iii) configuring the new software stack manager using the configuration data. In an embodiment, the data structures are obtained from a deployment manager. The data structures may be obtained from other locations without departing from embodiments disclosed herein.

Any of operations 406, 410, and 414 may be performed using one or more enablement actions (e.g., code blocks) specified in the subscription update. The enablement actions may be pushed to the host managed system for performance.

At operation 416, the subscription update is registered as being complete both locally and with a subscription management service. The subscription update may be registered locally by modifying a subscription information repository 164. The modification may indicate the subscription as well as limitations and disablement actions (e.g., code blocks) for the subscription. Similar information may be sent to the deployment manager which may provide similar information to the subscription management service which may perform a similar recordation.

At operation 418, the locally registered subscription update is enforced on the host managed system. The locally registered subscription update may be enforced by monitoring operation of the host managed system to identify whether the subscription is exceeded, and performing the disablement actions when the subscription is determined as being exceeded based on the operation monitoring.

The method may end following operation 418.

Figure 5A:
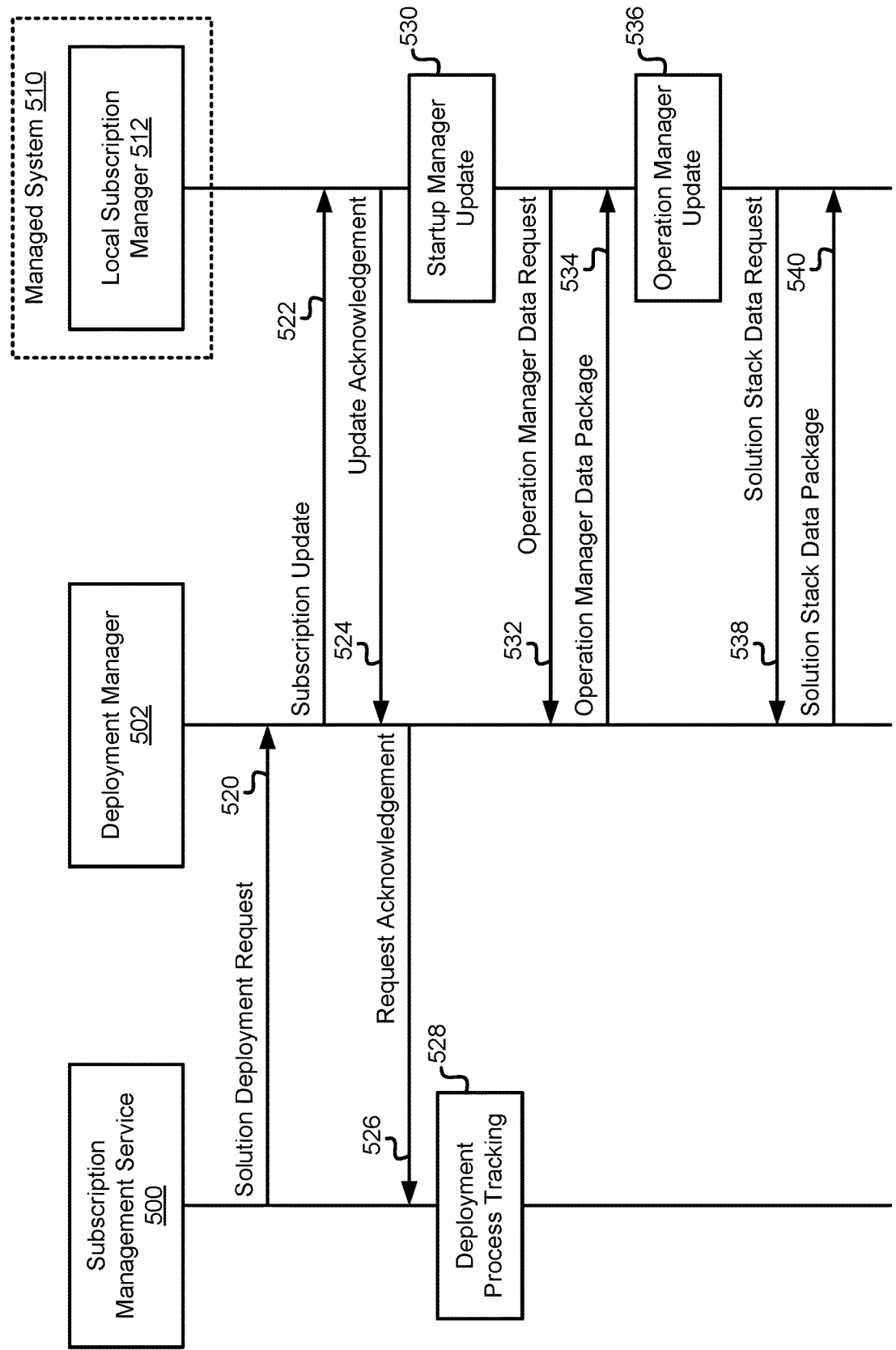
FIGS. 5A-5B show diagrams illustrating interactions between and actions of components of a system in accordance with an embodiment.
Figure 5B:
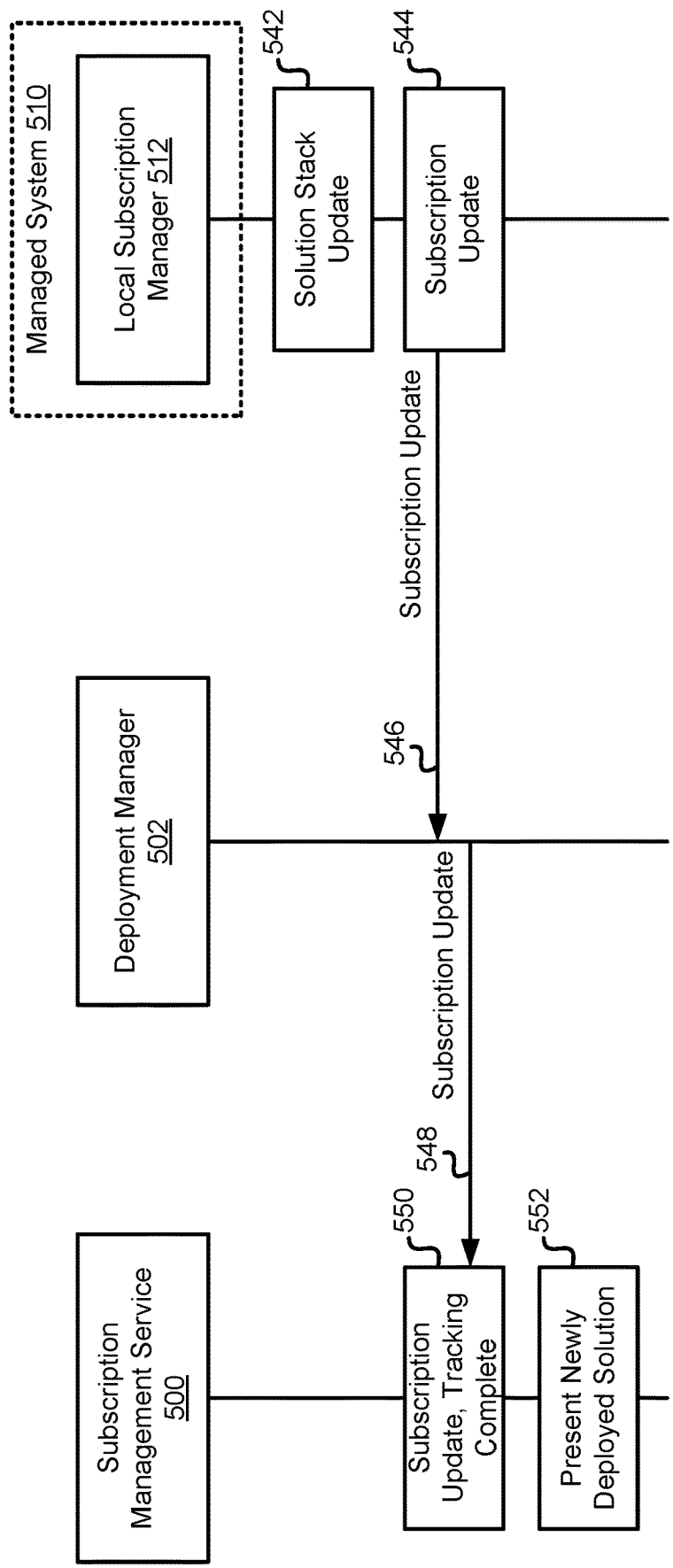

Turning to FIGS. 5A-5B, interaction diagrams in accordance with an embodiment are shown. In these figures, a system similar to that illustrated in FIG. 1A may be operating. In these figures, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

Turning to FIG. 5A, an interaction diagram illustrating a process of providing subscription based solutions in accordance with an embodiment is shown. In FIG. 5A, subscription manager 500 may manage a deployment including deployment manager 502 and managed system 510.

At block 520, subscription management service 500 sends a solution deployment request to deployment manager 502. Based on the request, deployment manager 502, at block 522, may generate and send a subscription update to local subscription manager 512 of managed system 510 to initiate a change in the configuration of managed system 510 to provide the solution specified by the solution deployment request. The subscription update may indicate changes to a startup manager, operation manager, and software stack of managed system 510.

At block 524, local subscription manager 512 sends an update acknowledgement to deployment manager 502 to indicate that managed system 510 is being reconfigured. At block 526, deployment manager 502 sends a request acknowledgement to indicate to subscription management service 500 that the solution is in the process of being deployed. In response to the request acknowledgement, subscription management service 500, at block 528, may initiate deployment process tracking for the solution.

At block 530, local subscription manager 512 initiates a startup manager update for managed system 510. To do so, local subscription manager may cause managed system 510 to execute one or more code blocks thereby causing enablement actions to be performed. Consequently, the startup manager to which managed system 510 is subscribed may be changed.

At block 532, local subscription manager 512 sends an operation manager data request to deployment manager 502 to request an image of a new operation manager. At operation 534, deployment manager 502 provides an operation manager data package including the image of the new operation manager. At block 536, local subscription manager 512 initiates an operation manager update for managed system 510. Doing so may deploy the new operation manager to managed system 510 with the obtain image of the new operation manager.

As part of the operation manager update, managed system 510 may be restarted which may cause startup manager to perform a startup process leading up to handoff of managed system 510 to the new operation manager.

At block 538, local subscription manager 512 sends a solution stack data request to deployment manger 502 for a new solution stack. At block 540, deployment manager 502 provides a solution stack data package to managed system 510. The solution stack data package may include data structures usable to install one or more applications on managed system 510.

The process may continue in FIG. 5B.

Turning to FIG. 5B, a continuation of the diagram illustrated in FIG. 5A is shown.

At block 542, local subscription manager 512 may perform a solution stack update of managed system 510 by installing one or more applications using the solution stack data package. At block 544, local subscription manager 512 performs a subscription update to locally register the subscriptions for the startup manager, operation manager, and solution stack.

At block 546, local subscription manager 512 sends a subscription update to deployment manager 502. In response, at block 548, deployment manager 502 may send the subscription update to subscription management service 500 which may interpret the subscription update as an acknowledgement that the solution is implemented and available for use with managed system 510, and/or other managed systems.

At block 550, subscription management service 500 performs a subscription update using the subscription update and treats the solution tracking as being complete.

At block 552, subscription management service 500 present the new deployed solution to users to allow the solution to begin to be utilized through the computer implemented services provided by managed system 510.

Thus, via the processes illustrated in FIGS. 5A-5B, embodiments disclosed herein may provide for the automated deployment of solutions using managed systems while enabling the solutions to be terminated when subscriptions for the solutions are exceeded.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

As discussed above, various components may be implemented with computing devices. For example, any of the components illustrated in FIGS. 1A-5B may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for providing a solution using managed systems, the method comprising:
    obtaining, by a local subscription manager hosted by a managed system of the managed system, a subscription update for the managed system, the local subscription manager being installed inside the managed system as a separate and independent computing device from the managed system;
    based on the subscription update, updating, by the local subscription manager operation of a startup manager of the managed system, an operation manager of the managed system, and a software stack of the managed system without also updating any components of the local subscription manager;
    locally registering, by the local subscription manager, a subscription based on the updating;
    remotely registering, by the local subscription manager, the subscription with a subscription management service that initiated the subscription update; and
    enforcing, by the local subscription manager, the locally registered subscription on the managed system.

2. The computer-implemented method of claim 1, wherein updating the operation of the startup manager comprises:
    reconfiguring the startup manager to indicate that the managed system provides a function associated with the subscription, the function being part of the solution; and
    reconfiguring the startup manager to perform a startup of the managed system based on the subscription, the startup comprising a series of operations and being different from a second series of operations performed by the startup manager prior to reconfiguration of the startup manager.

3. The computer-implemented method of claim 2, wherein updating the operation of the operation manager comprises:
    identifying an operating system based on the subscription update;
    obtaining a copy of an image of the operating system; and
    deploying the image to the managed system, the deployed image causing the managed system to host a copy of the operating system after the reconfigured startup manager completes startups of the managed system and the operating system being different from a second operating system hosted by the managed system prior to deployment of the image of the operating system to the managed system.

4. The computer-implemented method of claim 3, wherein obtaining the copy of the image of the operating system comprises:
    sending a request for the image to a deployment manager associated with the managed systems; and
    receiving a copy of the image from the deployment manager provided in response to the request for the image.

5. The computer-implemented method of claim 3, wherein updating the operation of the software stack comprises:
    identifying a new software stack based on the subscription update;
    obtaining a copy of the new software stack; and
    deploying the new software stack to the managed system, the deployed new software stack providing computer implemented services for the solution while the copy of the operating system is hosted by the managed system, and the computer implemented services being different from second computer implemented services provided by the software stack prior to deployment of the new software stack.

6. The computer-implemented method of claim 5, wherein obtaining the copy of the new software stack comprises:
    sending a request for the new software stack to a deployment manager associated with the managed systems; and
    receiving a copy of the new software stack from the deployment manager provided in response to the request for the new software stack.

7. The computer-implemented method of claim 1, wherein the operation of the operation manager is updated:
prior to updating of the operation of the software stack, and
after updating of the operation of the startup manager.

8. The computer-implemented method of claim 7, wherein the managed system is rebooted after the updating of the operation manager and prior to the updating of the software stack.

9. The computer-implemented method of claim 1, wherein the local subscription manager comprises a computing device hosted by the managed system, and the computing device operates independently from the managed system.

10. The computer-implemented method of claim 9, wherein the computing device receives the subscription update via an out of band management interface to the subscription management service.

11. The computer-implemented method of claim 1, wherein enforcing the locally registered subscription on the managed system comprises:
making a determination that the locally registered subscription has expired; and
based on the determination, disabling a portion of the startup manager, the operation manager, and the software stack to prevent the solution from being provided with the managed system.

12. The computer-implemented method of claim 11, wherein the portion is disabled while the local subscription manager is unable to communicate with the subscription management service.

13. A non-transitory machine-readable medium having instructions stored therein, which when executed by a processor, cause the processor to perform operations for providing a solution using managed systems, the operations comprising:
obtaining, by a local subscription manager hosted by a managed system of the managed system, a subscription update for the managed system, the local subscription manager being installed inside the managed system as a separate and independent computing device from the managed system;
based on the subscription update, updating, by the local subscription manager operation of a startup manager of the managed system, an operation manager of the managed system, and a software stack of the managed system without also updating any components of the local subscription manager;
locally registering, by the local subscription manager, a subscription based on the updating;
remotely registering, by the local subscription manager, the subscription with a subscription management service that initiated the subscription update; and
enforcing, by the local subscription manager, the locally registered subscription on the managed system.

14. The non-transitory machine-readable medium of claim 13, wherein updating the operation of the startup manager comprises:
reconfiguring the startup manager to indicate that the managed system provides a function associated with the subscription, the function being part of the solution; and
reconfiguring the startup manager to perform a startup of the managed system based on the subscription, the startup comprising a series of operations and being different from a second series of operations performed by the startup manager prior to reconfiguration of the startup manager.

15. The non-transitory machine-readable medium of claim 14, wherein updating the operation of the operation manager comprises:
identifying an operating system based on the subscription update;
obtaining a copy of an image of the operating system; and
deploying the image to the managed system, the deployed image causing the managed system to host a copy of the operating system after the reconfigured startup manager completes startups of the managed system and the operating system being different from a second operating system hosted by the managed system prior to deployment of the image of the operating system to the managed system.

16. A managed system, comprising:
a processor; and
a local subscription manager adapted to perform operations for managing a solution provided by the managed system, the local subscription manager being installed inside the managed system as a separate and independent computing device from the managed system and the operations comprises:
obtaining a subscription update for the managed system;
based on the subscription update, updating operation of a startup manager of the managed system, an operation manager of the managed system, and a software stack of the managed system without also updating any components of the local subscription manager;
locally registering a subscription based on the updating;
remotely registering the subscription with a subscription management service that initiated the subscription update; and
enforcing the locally registered subscription on the managed system.

17. The managed system of claim 16, wherein updating the operation of the startup manager comprises:
reconfiguring the startup manager to indicate that the managed system provides a function associated with the subscription, the function being part of the solution; and
reconfiguring the startup manager to perform a startup of the managed system based on the subscription, the startup comprising a series of operations and being different from a second series of operations performed by the startup manager prior to reconfiguration of the startup manager.

18. The method of claim 1, wherein the local subscription manager collects information regarding hardware resources installed within the managed system in which the local subscription manager is hosted.

19. The method of claim 18, wherein the subscription update specifies components to be used for updating the startup manager, the operation manager, and the software stack, and the local subscription uses the information regarding the hardware resources installed within the managed system to ensure that only components compatible with the hardware resources installed within the managed system are included as the components specified in the subscription update.

20. The method of claim 1, wherein the subscription update is based on a solution deployment request provided by a user associated with the managed system, the solution deployment request specifying solutions desired by the user to be implementable by the managed system without actually specifying components required for the updating of the startup manager, the operation manager, and the software stack to allow the managed system to be updated to provide the solutions.

* * * * *